Feb. 18, 1958 C. P. GABRIEL 2,823,687
VALVE STRUCTURE
Filed May 26, 1951 2 Sheets-Sheet 1

Inventor
Charles P. Gabriel
by Bair, Freeman & Molinare
Attys.

Feb. 18, 1958     C. P. GABRIEL     2,823,687
VALVE STRUCTURE
Filed May 26, 1951     2 Sheets-Sheet 2
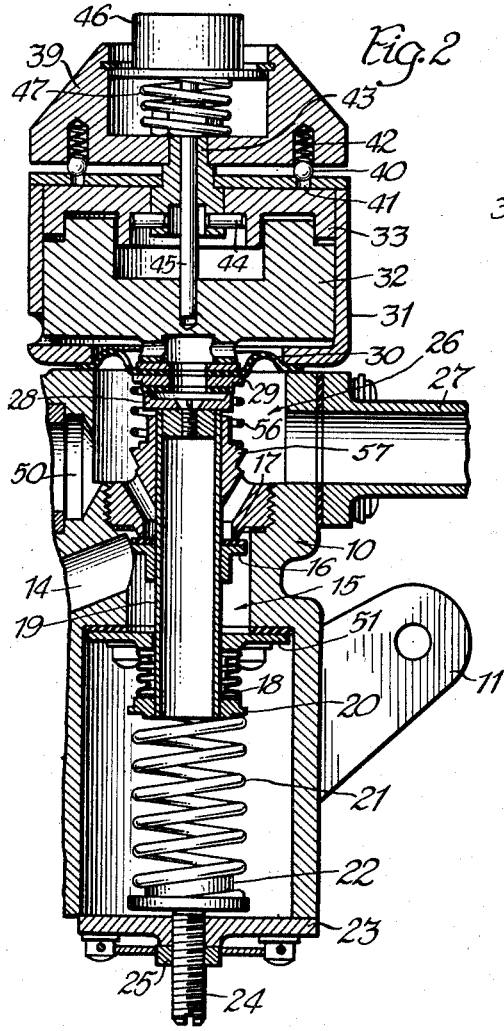
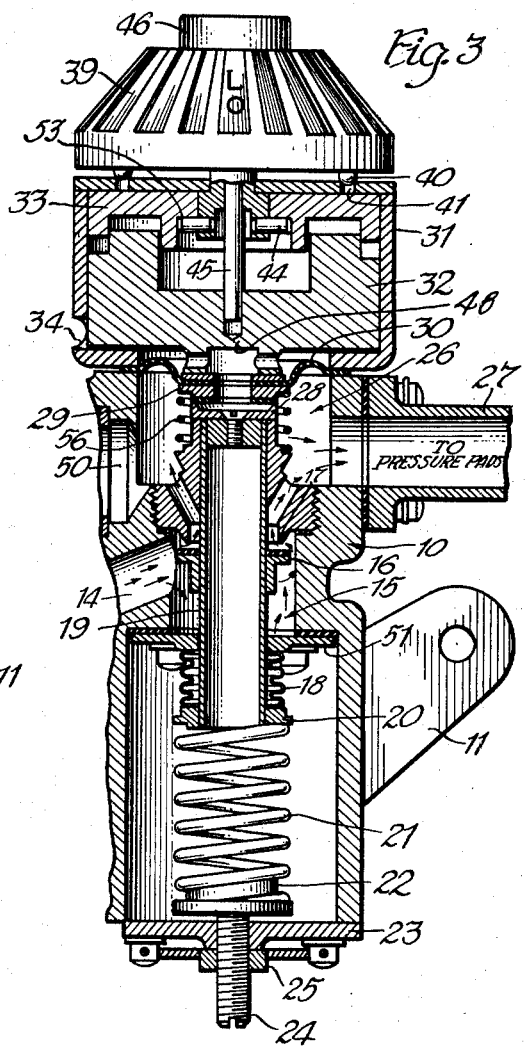
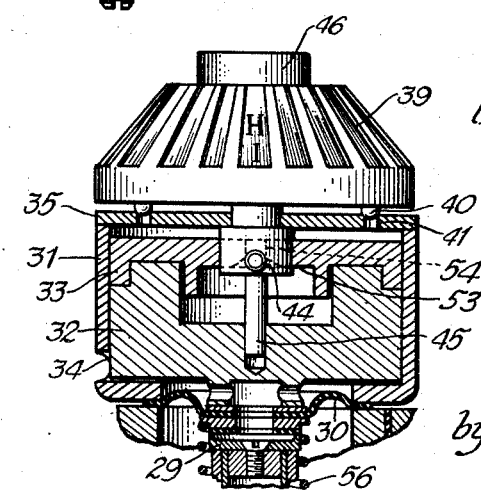
Inventor
Charles P. Gabriel
by Bair, Freeman & Molinare
Attys.

United States Patent Office 2,823,687
Patented Feb. 18, 1958

2,823,687

VALVE STRUCTURE

Charles P. Gabriel, Bryan, Ohio, assignor to The Aro Equipment Corporation, Bryan, Ohio, a corporation of Ohio Application May 26, 1951, Serial No. 228,427

3 Claims. (Cl. 137—38)

This invention relates to a valve structure and particularly one which is used in connection with anti-G (antigravity) pressure pads and the like in order to properly control the flow of a pressurizing medium to and from the pressure pads. In this connection, the present valve is used in airplanes doing dives and other maneuvers such as necessary during combat, and the purpose of the valve is to regulate the flow of compressed air or gas to pressure pads in the aviator's suit such as over the abdomen and back of the thighs and calves, so that in pulling out of a dive, for instance if the pull is 8 G's, the valve will automatically increase the pressure in the pressure pads to substantially compensate for the increased gravity or to over-compensate if desired, thus preventing the draining of blood from the brain and consequent black-out of the aviator.

One object of the invention is to provide a valve which nicely controls the flow of a pressurizing medium to the pressure pads and the exhaust of pressure therefrom when the excessive gravity pull begins to diminish, keeping the pressure pads at the proper pressure proportional to the gravity load at any particular instant, and to effect control of the flow of the pressurizing medium in such manner that none is wasted as in those types of anti-G valves that constantly bleed to atmosphere. This is particularly important when the valve is used in an airplane that does not have an air compressing system and instead uses bottled gas or the like as a pressurizing medium. In that case it is quite important to conserve as much as possible of the gas so as to have a sufficient supply to meet all needs and to minimize the necessity of carrying an oversize pressure tank.

More specifically, it is my object to provide a valve structure wherein a demand valve is normally closed by spring pressure or the like and is loaded with a gravity load to proportionally open the same when the gravity is in excess of a predetermined value such as one G, with the degree of opening increasing with the gravity load up to some predetermined value such as 3 G's whereupon the valve is completely open if there is no pressure in the pressure pads and remains so until the initial fill is complete. The valve then gradually closes in accordance with the G's acting on the valve and shuts off completely whenever the pressure requirements of the pressure pads are satisfied. This is accomplished by having a standard weight opposing a predetermined spring and the valve being mounted upright in an airplane or the like so that as the airplane pulls out of a dive, the effective weight of the standard weight increases due to gravity.

It is a further object to provide in connection with the demand valve, a diaphragm supported exhaust valve connected directly with the weight and arranged to close off the exhaust valve and thereupon if the weight moves farther to immediately open the demand valve if the gravity load increases above a predetermined amount, the arrangement being such that when the gravity load decreases after an increase, it will close the demand valve and open the exhaust valve a proportional amount for letting the pressure medium out of the pressure pads to exactly compensate for the reduction in gravity load, the diaphragm being subject to the pressure in the pressure pads for cooperating with the weight in properly positioning the demand and exhaust valves.

A further object is to provide a secondary gravity load selectively imposable on the valve structure for increasing the gravity load ratio of operation of the valve which is found desirable particularly by experienced pilots.

Still a further object is to provide a manual control for the valve to open the demand valve if desired, thus manually controlling the flow of the pressure medium to the pressure pads for massaging operations to counteract tiredness of the muscles during flights.

With these and other objects in view, my invention consists in the construction, arrangement and combination of the various parts of my valve structure, whereby the objects contemplated are attained, as hereinafter more fully set forth, pointed out in my claims and illustrated in the accompanying drawings, wherein:

Figure 2 is a similar sectional view showing the valve parts in an intermediate position with neither the demand valve nor the exhaust valve open.

Figure 3 is a similar sectional view showing the position of the parts when the gravity load demands the flow of pressurizing medium to the pressure pads.

Figure 4 is a view similar to the upper portion of Figure 3 showing a secondary gravity load released and thereby imposed along with the primary gravity load on the anti-G valve.

Figure 1:
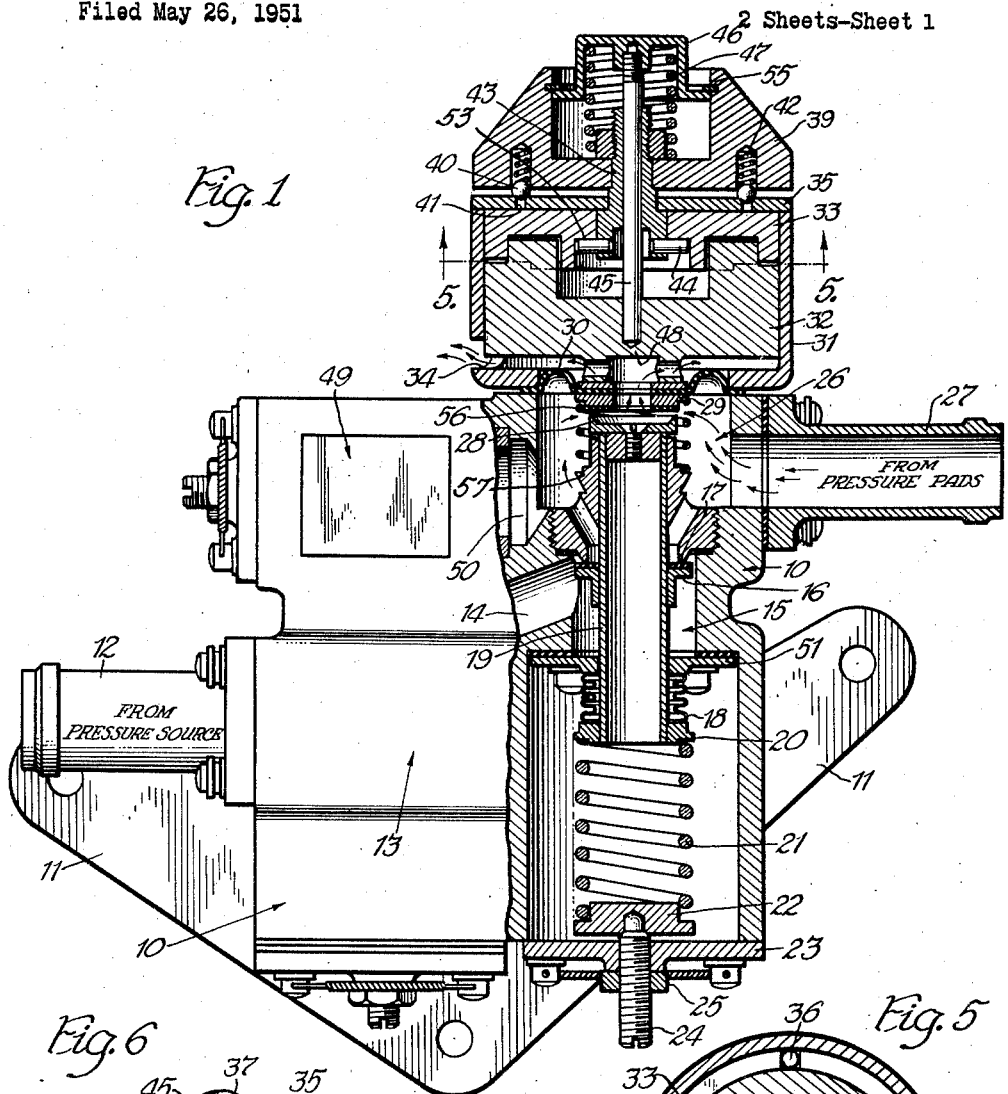
Figure 1 is a side elevation of an anti-G valve embodying my present invention and showing in cross section the essential operating parts of the control valve structure responsive to gravity, the valve being shown in position for exhausting the pressure medium from the pressure pads.
Figure 6:
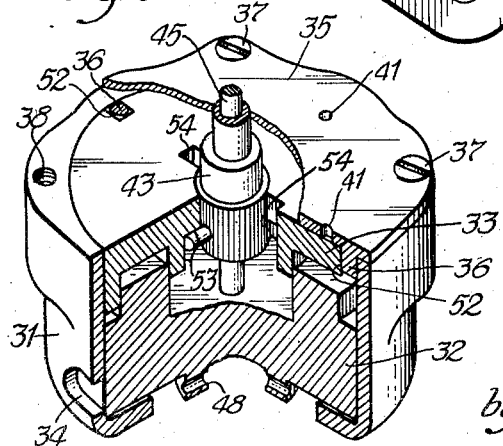
Figure 6 is a perspective view of a portion of the valve with parts broken away and other parts shown in section.
Figure 5:
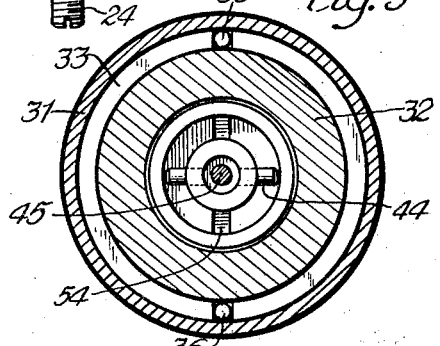
Figure 5 is a sectional view on the line 5—5 of Figure 1.

On the accompanying drawings I have used the reference numeral 10 to indicate in general a valve body. The valve body 10 may be provided with an attaching bracket 11 for mounting the valve body in an airplane or the like. An inlet 12 is provided for pressurizing medium and this inlet leads to a pressure reducing section 13 of the valve containing a pressure reducing valve which forms no part of my present invention. An outlet 14 extends from the pressure reducing valve section 13 to a demand valve chamber 15.

Within the chamber 15 a first demand valve element 16 suitably faced with a resilient material on its upper surface is normally seated against a second demand valve element in the form of a valve seat 17. A balancing bellows 18 having an effective diameter equal to the diameter of the valve seat 17 opposes the valve seat and is connected at its upper end to a closure plate 51. Its lower end is connected to a bellows head 20 on a valve supporting tube 19.

The demand valve element 16 is secured to the tube 19. The closure plate 51 has enough clearance around the tube 19 to suitably guide the tube and permit pressure from the outlet 14 to enter the bellows 18 so that the demand valve element 16 is properly balanced between the bellows and the valve seat 17.

A spring 21 seats against the bellows head 20 and against a spring seat 22. A cover plate 23 on the valve body 10 has an adjusting screw 24 threaded therethrough for the spring seat 22, a lock nut 25 being provided for retaining the adjustment.

Within the valve body 10 is an intermediate valve chamber 26 having a connection 27 to the pressure pads or other points of utilization of pressure from the valve. The valve tube 19 carries a first exhaust valve element in the form of a valve seat 28 with which a second exhaust valve element 29 suitably faced on its lower surface with resilient material is adapted to coact. The exhaust valve 29 is supported by a diaphragm 30 which separates the intermediate chamber 26 from an exhaust port 34.

A spring 56 is interposed between a shoulder 57 (constituting a part stationary with the valve seat 17) and the exhaust valve element 29 to normally overcome the primary weight 32 as in Figure 1 and thus keep the exhaust valve 28—29 open for the escape of pressure from the pressure pads.

Above the diaphragm 30 a weight housing 31 is provided in which there is a primary weight 32 and a secondary weight 33. A cover plate 35 is provided for the weight housing 31 and it has a pair of pins 36 depending therefrom into slots 52 of the secondary weight 33 to prevent rotation thereof relative to the housing 31. The cover plate 34 is held in position by screws 37 entering threaded openings 38 of the housing.

A control knob 39 is provided, the purpose of which will hereinafter appear. Detent balls 40 are carried thereby for coaction with detent holes 41 of the cover plate 35 under the action of detent springs 42.

A sleeve 43 has the knob 39 secured thereto and is rotatable on the cover plate 35. Secondary weight supporting pins 44 are carried by the sleeve and are adapted to coact with a central surface 53 of the secondary weight 33 to normally retain the secondary weight in raised position, or with slots 54 as in Figure 4 to release this weight so that it is added to the primary weight 32 for a purpose which will hereinafter appear.

A stem 45 is slidable in the sleeve 43 and a manual control button 46 is secured to the upper end thereof. It is normally held in the raised position by a return spring 47 against a retainer ring 55 in the knob 39. The stem 45 extends downwardly into the weight 32 and is adapted to coact with a web 48 thereof. The valve body 10 also has a relief valve section 49. A passageway 50 from the intermediate chamber 26 leads thereto.

*Practical operation*

In the operation of my valve structure, assuming that the primary weight 32 only being imposed on the valve structure and that no pressure is required for the pressure pads because the airplane is traveling level, the valve parts will be in the position of Figure 1. The demand valve element 16 is closed against the seat 17 by the spring 21 suitably adjusted to require a certain gravity load (usually somewhat greater than one G) to commence to open the demand valve.

Pressurizing medium is admitted through the inlet 12 to the pressure regulating section 13 wherein the pressure is regulated to a workable constant. For instance the pressure admitted at 12 may be several hundred p. s. i., whereas the desired pressure for actuation of the anti-G valve may be only a few lbs. The pressurizing medium is controlled, as to flow into the intermediate chamber 26 and from thence to the pressure pads through the connection 27, by the demand valve element 16 which is pressure balanced by the bellows 18. The pressure relief section 49 is for protection in case of malfunctioning of any part of the valve structure and consequent excess pressure introduced through the demand valve 18 into the intermediate chamber 26.

Referring now to Figure 3, when the airplane assumes a certain path such as when pulling out of a dive, gravity increases the effective weight of the primary weight 32 and it therefore moves downwardly. The normal position of the parts being as shown in Figure 1 with the exhaust valve 28—29 open for relieving pressure from the connection 27 and thus from the pressure pads, as indicated by the arrows, when the primary weight 32 is actuated by gravity, it closes the exhaust valve as in Figure 2 and if the gravity load persists, it then opens the demand valve 16 as in Figure 3. This permits the pressurizing medium to flow through the demand valve and into the connection 27 and then to the pressure pads until the pressure demand has been satisfied (i. e.—as prorated per G load). Pressure is thereby increased in the chamber 26 under the diaphragm 30 and the exhaust valve element 29 which permits the demand valve element 16 to close again as in Figure 2. If the pressure demand (G activated load imposed by weight 32) is less than the established pressure in the connection 27, the diaphragm 30 is lifted further thus opening the exhaust valve and permitting the excessive pressure to bleed to atmosphere through the outlet port 34, as indicated by the arrows in Figure 1.

The greater the effect of gravity, the faster will be the opening of the valve element 16 until it is wide open at, for instance, 3 G's if there is no pressure in the pressure pads. The valve then remains wide open until the initial fill is complete whereupon it gradually closes and finally shuts off when the pressure demand is satisfied. When operating above a predetermined gravity load therefore, my valve affords maximum protection with a fast initial fill whereupon the gas flow is then tapered off as the suit pressure approaches the required G rate thus proportioning the flow of pressure to the gravity demand. Thereby, when greater pressure is demanded in the pressure pads to compensate for additional effective gravity, the demand valve responds for regulating the supply in accordance with the demand, and the combination of gravity load and pressure under the diaphragm 30 accomplishes the desired pressure regulating action for the pressure pads. The complete opening of the valve above a predetermined gravity load provides for maximum protection to the pilot against mounting gravity loading by means of a fast initial fill of the pads and then a tapering off of the filling rate as the pad pressure approaches the G rate existing at any particular moment.

When the gravity activated loading is removed entirely, pressure from the pressure pads act on the diaphragm 30 to lift it and the exhaust valve element 29 thereby exhausting pressure from the pressure pads to atmosphere and permitting the pads to go back to normal atmospheric pressure in which condition they are ineffective to press against the muscles of the aviator.

The relief valve section 49 is set so as to limit build-up of pressure in the connection 27 to physiological safe limits, this being about 10 G's. The primary weight 32 gives a standard or low G rate and when the secondary weight 33 is used in conjunction with the primary weight, a high G rate is obtained. This is selectively controlled by a 90° rotation of the control knob 39.

For the purpose of manually controlling the massage of tired muscles, the button 46 is provided which, when depressed, causes the demand valve to open thus pressurizing the connection 27 to the extent desired and when that extent is reached, then the button may be released either partially to maintain the pressure by having both the demand valve and the exhaust valve closed, or entirely to relieve the pressure whereupon the pressure will act on the diaphragm for opening the exhaust valve and the parts will then be in the position shown in Figure 1 for complete release of pressure from the pads.

The primary weight 32 in relation to the spring 21 is so calculated as to give a "normal" anti-G operation to the valve structure. This is preferred by inexperienced pilots until they have experienced several operations of the pressure pads. Then they prefer a greater pressure proportional to gravity in the pads and this may be selectively obtained by imposing the secondary weight 33 on the primary weight 32.

In Figures 1, 2 and 3, the secondary weight is held in the raised position by the control knob 39 rotated to a position for the pins 44 of its sleeve 43 to engage the surfaces 53 of the secondary weight. This is indicated by the notation "Lo" on the knob shown in Figure 3. When the knob is turned a quarter turn to the "Hi" position of Figure 4, however, the pins 44 line up with slots 54 of the secondary weight so that the secondary weight may thus be released and will rest on the primary weight 32. Then the demand valve will stay open longer in response to gravity loads for causing a faster rate of pressurizing the pads and will thereafter maintain them at a higher pressure proportional to G load than when the primary weight only is used.

Also during the maneuvers if the pilot becomes tired from successive operations, it is quite often helpful to massage the muscles against which the pressure pads are located by introducing pressure thereto in controlled amounts and this may be accomplished manually by depressing the button 46 which will move the weight 32 downwardly and open the demand valve element 16 under manual control when gravity is not acting on the weight to do so. The manual control button 46 is therefore a valuable addition to the valve structure disclosed.

Some changes may be made in the construction and arrangement of the parts of my valve structure without departing from the real spirit and purpose of my invention, and it is my intention to cover by my claims any modified forms of structure or use of mechanical equivalents which may be reasonably included within their scope.

I claim as my invention:

1. In a valve structure adapted to be interposed between a source of pressure medium and pressure pads or the like, a valve body, a demand valve chamber, said source being adapted to be attached thereto, an exhaust valve chamber and an intermediate chamber therein, said intermediate chamber being adapted for communication with the pressure pads, a movable valve member, first demand and exhaust valve elements carried thereby and both fixed relative thereto, cooperating second demand and exhaust valve elements stationary and movable respectively in said valve body, upwardly acting means constantly biasing said demand valve elements closed independent of the force of gravity, diaphragm means separating said intermediate chamber from said exhaust valve chamber and carrying said second exhaust valve element, a bellows separating said inlet chamber from atmosphere and having an effective diameter equal at all times to the effective diameter of said demand valve elements, and a single downwardly movable weight operatively connected with said second exhaust valve element and said diaphragm means to permit said upwardly acting means to close said demand valve elements when gravity acting on said weight is normal, said weight upon downward movement under the force of increase of the gravity load above normal engaging said second exhaust valve element with said first exhaust valve element, and through them immediately disengaging said first demand valve element from said second demand valve element as such downward movement continues and said weight overcomes said upwardly acting means and the pressure of the medium admitted through said demand valve elements and acting on said diaphragm means, said weight thereupon retaining said exhaust valve elements closed except when said weight responds upwardly to gravity load decrease.

2. In a valve structure adapted to be interposed between a source of pressure medium and a source of pressure use, a valve body, a demand valve chamber, said source being adapted to be attached thereto, an exhaust valve chamber and an intermediate chamber therein, said intermediate chamber being adapted for communication with the source of pressure use, a movable valve member, first demand and exhaust valve elements carried thereby and each fixed in relation thereto, cooperating second demand and exhaust valve elements which are stationary and movable respectively in said valve body, a diaphragm separating said intermediate chamber from said exhaust valve chamber and carrying said second exhaust valve element, an upwardly acting spring to normally retain said demand valve closed, and a single weight operatively connected with said second exhaust valve element and said diaphragm, said spring retaining said demand valve closed against the action of said weight when normal gravity acts thereon, said weight moving downwardly and engaging said second exhaust valve element with said first exhaust valve element and thereby disengaging said first demand valve element from said second demand valve element when the gravity load on said weight increases above normal and thereby overcomes said spring and the pressure of the medium admitted through said demand valve and acting on said diaphragm, said weight thereupon retaining said exhaust valve closed except when said weight responds upwardly to gravity load decrease.

3. In a valve structure adapted to be interposed between a source of pressure medium and pressure pads or the like, a valve body, a demand valve chamber, said source being adapted to be attached thereto, an exhaust valve chamber and an intermediate chamber therein, said intermediate chamber being adapted for communication with the pressure pads, a movable valve member, first demand and exhaust valve elements carried thereby and fixed thereto, cooperating second demand and exhaust valve elements, stationary and movable respectively in said valve body a diaphragm separating said intermediate chamber from said exhaust valve chamber and carrying said second exhaust valve element, an upwardly acting spring to normally retain said demand valve closed, a second upwardly acting spring to normally retain said exhaust valve open, and a weight operatively connected with said second exhaust valve element and said diaphragm, said weight, when normal gravity alone acts downwardly thereon, being insufficient to overcome said springs and the pressure of the medium acting on said diaphragm, and, when a force greater than normal gravity acts downwardly thereon, engaging said second exhaust valve element with the first exhaust valve element and thereby disengaging said first demand valve element from said scond demand valve element and overcoming the force of said springs plus the pressure of the medium admitted through said demand valve and acting on said diaphragm, said weight thereupon retaining said exhaust valve closed except when said weight responds upwardly to gravity load decrease.

References Cited in the file of this patent

UNITED STATES PATENTS

| | | |
|---|---|---|
| 602,548 | Williams et al. | Apr. 19, 1898 |
| 1,474,192 | Gessler | Nov. 13, 1923 |
| 1,747,910 | Siefarth | Feb. 18, 1930 |
| 2,345,223 | Upp | Mar. 28, 1944 |
| 2,499,793 | Stearns | Mar. 7, 1950 |
| 2,622,609 | Moller | Dec. 23, 1952 |

FOREIGN PATENTS

| | | |
|---|---|---|
| 511,417 | Germany | Oct. 30, 1930 |
| 604,304 | Great Britain | of 1948 |
| 623,231 | France | of 1927 |